United States Patent [19]

Karnofsky

[11] 3,970,764

[45] July 20, 1976

[54] PROCESS FOR PREPARING A PROTEIN CONCENTRATE WITH MINIMAL PROTEIN DENATURATION

[75] Inventor: George B. Karnofsky, Pittsburgh, Pa.

[73] Assignee: Dravo Corporation, Pittsburgh, Pa.

[22] Filed: Dec. 27, 1974

[21] Appl. No.: 536,802

[52] U.S. Cl. ............................... 426/430; 426/474; 34/10
[51] Int. Cl.² .......................................... A23L 1/20
[58] Field of Search ........... 426/430, 474, 475, 476, 426/634; 34/10, 182; 260/412.4, 412.8; 202/174

[56] References Cited
UNITED STATES PATENTS 2,790,708  4/1957  Karnofsky..................... 260/412.4 X
3,392,455  7/1968  Kingsbaker..................... 34/182 X

FOREIGN PATENTS OR APPLICATIONS 555,636  9/1943  United Kingdom.............. 260/412.4

OTHER PUBLICATIONS

J. of Amer. Oil, Chem. Soc., vol. 38, No. 9, 473–478, Sept. '61.
J. of Amer. Oil Chem. Soc., vol. 39, No. 4, 222–226, Apr. '62.

Primary Examiner—Robert Halper
Attorney, Agent, or Firm—Marn & Jangarathis

[57] ABSTRACT

A vapor desolventizing process for the removal of aqueous alcohol solvent residue in extracted soybean flakes by recycling vapor to the desolventizer having an alcohol content higher than that of the solvent retained by the extracted flakes to thereby preserve protein dispersibility of the extracted flakes.

8 Claims, 2 Drawing Figures

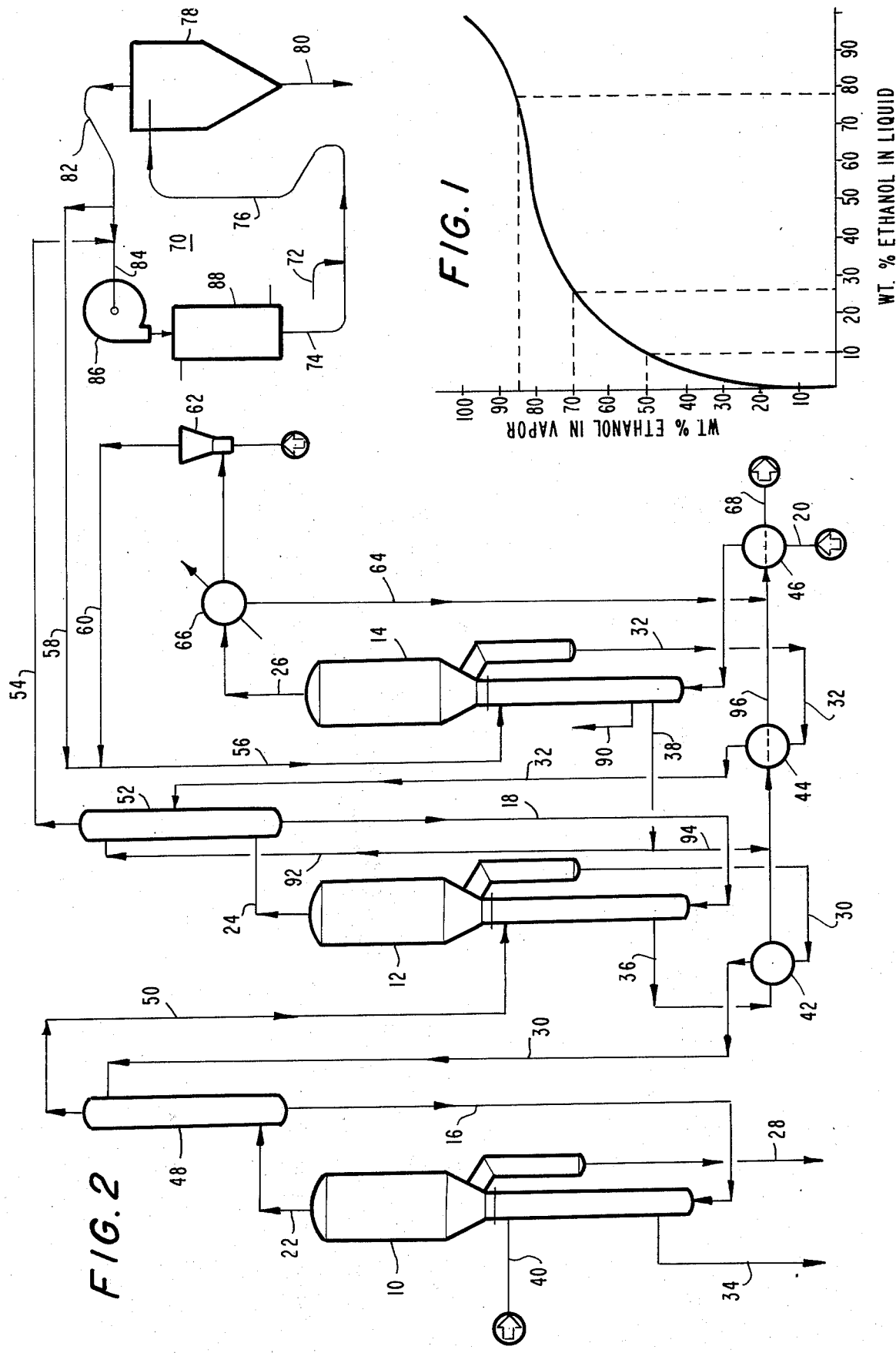

PROCESS FOR PREPARING A PROTEIN CONCENTRATE WITH MINIMAL PROTEIN DENATURATION

BACKGROUND OF THE INVENTION

This invention relates to vapor desolventizing, and more particular, to a process for the vapor desolventizing of spent oleaginous seed materials extracted with aqueous alcohol solutions.

Oleaginous seed materials, such as soybeans, cottonseeds, peanuts, sesame seeds, and sunflower seeds contain high concentrations of nutritious proteins. Other constituents are fiber, oil and carbohydrates. Since the carbohydrates are often associated with characteristic undesirable flavors and since they are also the cause of flatulence when the untreated seeds are used in a human diet, it is known to extract flaked seeds first with a solvent, such as hexane to remove the oil content and then to extract the defatted flakes with a carbohydrate-selective solvent, to leave as the residue a protein concentrate.

Protein concentrate is a product made by selectively extracting carbohydrate from a deoiled seed to leave as residue a product of high protein content. More specifically, soybean protein concentrate is made by extracting de-oiled, undenatured, "white" soybean flakes, the residue containing by commercial definition at least 70% protein. The de-oiled so-called "white" soybean flakes used are made by extracting oil from dehulled flakes with hexane followed by desolventizing the extracted flakes, i.e. removing solvent from the de-oiled flakes by heating without overheating so as to minimize denaturation of the protein, as measured by protein solubility or dispersibility. In the process with which the present invention is concerned, white flakes are further extracted with aqueous alcohols such as methanol, ethanol or isopropanol to make soy protein concentrate.

It is known that carbohydrates can be extracted from de-oiled flakes with little extraction of protein, using strong alcohol solutions. Ethanol is a preferred alcohol because there is no objection to a food product which may contain traces thereof. Although the process of the present invention is described with reference to aqueous ethanol as the solvent, and to soybeans, it is to be understood that the invention is applicable, whatever the aqueous organic solvent, and whatever the oilseed being treated.

The concentration of ethanol in aqueous solution which may be practically used for selective extraction of carbohydrates ranges from between 50 to 75% by weight. At concentrations below 50%, the flakes become wetted and fragile. At concentrations above 75%, a product containing 70% protein cannot be realized since the carbohydrates which need to be extracted are not sufficiently soluble. If denaturation of protein in the product is not of consequence, it is advantageous to use for extraction a concentration of ethanol at the lower end of the range at well above ambient temperature, because low concentration and high temperature promote carbohydrate extraction. However, both low concentrations and high temperatures cause rapid denaturation of proteins. If protein solubility is to be preserved, the concentration of ethanol in the aqueous organic solvent must be above about 65% and extraction temperature not higher than about 95°F. (the lowest temperature that can be used in practice without resorting to refrigeration of cooling water).

Protein denaturation is measured by such standard tests as Protein Dispersibility Index (PDI), Nitrogen Solubility Index (NSI) and indirectly by Water Absorption Index (WAI). PDI is measured by dispersing flakes in water, then separating by centrifuging the flakes from the aqueous phase. PDI is the percentage of the nitrogen in the flakes found in the aqueous phase.

The present invention is concerned with the recovery of aqueous organic solvent from extracted spent flakes by heating (desolventizing) with minimal loss of protein dispersibility. It is known to recover solvent by heating either by conveying the spent flakes through a steam-jacketed conveyor, or by bringing them into contact with superheated solvent vapor. The latter method is exemplified by the flash desolventizing system described in U.S. Pat. No. 3,367,034, with the vapor desolventizing system being described in U.S. Pat. No. 2,571,143. Desolventizing with super-heated solvent vapor is particularly applicable when the dispersibility of the protein is to be preserved by minimizing retention time and temperature during desolventizing. Conventional flash desolventizing with super-heated vapor has been applied to desolventizing alcohol-extracted flakes at the Northern Regional Research Laboratory of the U.S. Department of Agriculture (Mustakas et. al., Journal of the American Oil Chemists' Society 38, 473 – 8 (1961) and 39, 222 – 6 (1961). Under conditions at which it might have been expected that protein dispersibility would have been retained, protein was practically completely denatured in the desolventizing step when the solvents were 70% methanol and 70% ethanol. There was little or no protein denaturation when the solvents were absolute ethanol, 95% ethanol, and 91% isopropanol.

A complete process for producing protein concentrate includes an extraction step, a spent flakes desolventizing step, and a miscella evaporation step. Although the miscella evaporation step, per se, is not part of the present invention, the present invention does require that miscella evaporation include a rectification step to produce a vapor stronger in alcohol concentration as compared to the alcohol concentration of the aqueous alcohol solvent.

OBJECTS OF THE INVENTION

An object of the present invention is to provide a novel process for desolventizing the aqueous alcohol solvent residual in extracted soybean flakes while preserving protein dispersibility.

Another object of the present invention is to provide a novel process for desolventizing the aqueous alcohol solvent residual in extracted soybean flakes while avoiding the requirement of passing the flakes through a stage of the process in which the flakes are wetted and softened by water.

SUMMARY OF THE INVENTION

This and other objects of the present invention are achieved by introducing into the desolventizing zone a vapor stream having a concentration of alcohol greater than the concentration of alcohol of the solvent retained by the extracted flakes.

In a preferred embodiment of the invention, a vapor mixture of alcohol and water of a concentration higher than that of the extraction solvent is generated by distilling solvent from the miscella from the extraction step and by rectifying at least a portion of the vapor so distilled to increase its alcohol content to the desired concentration, which vapor mixture is passed to the inlet of the recycle vapor heater of a desolventizing zone.

BRIEF DESCRIPTION OF THE DRAWINGS

A better understanding of the present invention as well as additional objects and advantages thereof will be apparent upon consideration of the detailed disclosure thereof, especially when taken with the accompanying drawings, wherein:

FIG. 1 is a vapor-liquid phase diagram of the system ethanol-water; and

FIG. 2 is a schematic flow diagram of the process of the present invention integrated with a multiple-effect evaporation system.

DETAILED DESCRIPTION OF THE INVENTION

When an extraction solvent has an alcohol concentration of 65% or above, as is required for maximum retention of protein dispersibility, there are additional advantages as compared with extraction with an aqueous alcohol solvent at lower alcohol concentrations. The white flakes swell less in strong alcohol solution, remain stronger and retain less solvent to be subsequently removed by desolventizing. When the flakes imbibe strong alcohol solution, they hold more water without becoming soggy than would be possible in the absence of alcohol. For example, if flakes enter the desolventizing zone with 50% volatiles which are 70% alcohol, there are 0.3 lb of water per lb of dry flakes. In the absence of alcohol, the flakes would be soft and adhesive.

Whether the solvent is strong or weak alcohol, the ratios of solvent to flakes required for extraction are high compared with those customarily used in oil seed extraction. It is the commercial practice to remove oil from soybeans by counter-current extraction using less than one pound of hexane solvent per pound of flakes. Extraction with aqueous alcohol requires ratios of solvent to flakes ranging from 4 to 10 pounds of solvent per pound of flakes fed, the ratio increasing with increasing alcohol concentration. Of this solvent. 0.3 to 1.5 pounds may be held up in the extracted flakes introduced into the desolventizing zone with the remainder being in the miscella. To minimize heat required for desolventizing, it is known to press the flakes leaving the extractor prior to desolventizing. To minimize heat required for recovering solvent from the miscella, it is known to employ multiple-effect evaporation.

In a vapor or flash desolventizing system as conventionally employed, solvent is vaporized from the flakes by contacting them with superheated solvent vapor. Sensible heat given up by the vapor is converted to latent heat for vaporizing solvent. In practice, this is accomplished by continuously contacting flakes with a solvent vapor stream which is recycled by a blower through a recycle vapor heater to replenish its sensible heat. At a point in the closed path where the recycle vapor temperature is a minimum, it is vented to a condenser. Since the closed path has a fixed volume, the net vaporized solvent flows automatically to the condenser. The composition of the recycle vapor is essentially the same as that of the vapor flowing to the condenser. Since the solvent entering with the flakes may be practically completely vaporized in the desolventizer, it follows that the recycle vapor composition is essentially that of the solvent.

It is instructive to consider what happens to a single flake containing an aqueous alcohol solvent when exposed to a superheated vapor of the same composition.

FIG. 1 is the vapor-liquid equilibrium diagram for the ethanol-water system showing the vapor composition in equilibrium with any given liquid mixture. As is well known, the vapor is considerably richer in alcohol than the liquid. Thus, for example, vapor containing 50% ethanol is in equilibrium with liquid containing 9% ethanol; vapor containing 70% ethanol is in equilibrium with liquid containing 27% ethanol; and vapor containing 87% ethanol is in equilibrium with liquid containing 82.5% ethanol. These relationships are only slightly modified by the presence of soybean flakes.

Let it be supposed that flakes containing 38% volatiles that is, 0.61 lb. of volatiles per lb. of solid — which are 70% ethanol and 30% water are exposed to an excess of superheated vapor of the same composition. Each pound of flakes is initially associated with 0.43 lb. of ethanol and 0.18 lb. water. Flakes will be heated to the temperature at which the vapor pressure of ethanol over a 70% solution is equal to the partial pressure of ethanol in the vapor, and vaporization of ethanol only will commence. Ethanol vaporization will continue with a corresponding increase in flake temperature until the ethanol content of the liquid on the flakes is reduced to 27%. The liquid on one pound of flakes is now only 0.067 lb. of ethanol and 0.18 lb. of water. Flakes containing this much water and so little alcohol are wet and fragile. There is considerable likelihood that they will adhere to the wall of the desolventizer before they are dried by additional desolventizing.

During the remainder of the desolventizing, the ethanol content of the liquid associated with the flakes remains constant at 27%. When in contact with such dilute ethanol even for a short time of several seconds, protein in the flakes will be denatured.

Now, let these same flakes containing 38% volatiles which are 70% ethanol and 30% water be exposed to an excess of superheated vapor containing 87% ethanol. This vapor is in equilibrium with liquid containing 82.5% ethanol. The flakes will increase in temperature until the vapor pressure of water over a 70% solution is equal to the partial pressure of water in the vapor. Then water will only vaporize at gradually increasing flake temperature, until the ethanol content of the liquid in the flakes is increased to 82.5% and the remainder of the alcohol and water will evaporate at this concentration. Hence, no wetness, and little protein denaturation.

The present invention is concerned with the method and means of realizing a concentration of alcohol in the recycling vapor higher than that of the solvent on the flakes. To do so, I introduce vapor of higher concentration at a point in the vapor recycle path downstream from the vent to the condenser, so that the additional vapor mixes with the recycle stream and adds to the flow to the condenser. Consequently, the concentration of alcohol in the recycling stream lies between that of the solvent and that of the added vapor. For example, to create a recycling stream whose concentration is 87% ethanol, I would add 5.9 pounds of vapor whose ethanol concentration is 90.5% for each pound of solvent of 70% concentration to be removed from the flakes.

I have disclosed in a copending application (519,228, filed Oct. 30, 1974 Multiple Effect Evaporation Process) assigned to the same assignee as the present invention, a multiple-effect evaporation, stripping and rectification process uniquely applicable to the recovery of aqueous alcohol solvent from miscella made in a process where carbohydrates are selectively extracted to leave as residue a protein concentrate. In such evaporation, the extract is withdrawn from the evaporator as bottoms in aqueous solution which must be stripped free of alcohol.

Referring now to FIG. 2, illustrating a process for recovering alcohol solution of two or more concentrations, there is provided a plurality of evaporators 10, 12 and 14. Such evaporators are illustrated as being of the once-through rising film type, but may be modified for natural circulation by appropriate piping and valving connections. Such vertical rising film evaporators are particularly desirable for foamy solutions containing carbohydrates which result from the extraction of defatted soy flakes with aqueous alcohol solutions. As hereinabove mentioned, the evaporative system is arranged for multiple-effect operation with countercurrent flow of the vapor and liquid streams. The evaporators 10, 12 and 14 are provided with liquid inlet feed lines 16, 18 and 20, respectively. Vapors from the evaporators 10, 12 and 14 are withdrawn through lines 22, 24 and 26, respectively; and liquid streams therefrom are withdrawn through lines 28, 30 and 32, respectively. Condensates from the evaporators 10, 12 and 14 are withdrawn from the shell sides through lines 34, 36 and 38, respectively. A heat transfer medium such as steam is introduced by line 40 into the shell side of the first effect evaporator 10, with the heat transfer media for evaporators 12 and 14 being provided as more fully hereinafter discussed. The evaporative system of the present invention is provided for heat economy with intermediate heat exchangers 42, 44 and 46, as is common in the art.

A stripping tower 48 is provided auxiliary to the evaporator 10. A vapor stream from the evaporator 10 in line 22 is introduced into the lower portion of the stripping tower 48 and is passed in countercurrent contact wth the liquid stream in line 30 to cause the more volatile component in such liquid stream 30 to be stripped therefrom. Overhead vapors are withdrawn from stripping tower 48 in line 50 and are passed to the shell side of evaporator 12 as the heat transfer medium therefor.

A rectifying tower 52 is provided auxiliary to the evaporator 12 to provide an overhead stream 54 having an alcohol concentration greater than that of the solvent remaining with the extracted flakes to be desolventized. The vapor stream in line 24 from the evaporator 12 introduced into the lower portion of the rectifying tower 52 is passed in countercurrent contact with the liquid streams from lines 92 and 38 to remove the less volatile component from such vapor stream in line 24. Condensate stream 38 is split into two streams 92 and 94. Stream 92 is the controlled reflux to the rectifier 52; stream 94 is net solvent recovered from evaporator 14.

The evaporator 14 is heated by a vapor stream in line 56, a mixture of alcohol and water vapors from the desolventizing system entering in line 58, and a vapor stream in line 60, mostly steam, from a steam-jet ejector 62. Condensate in line 64 is withdrawn from a condenser 66 and is combined in line 68 with condensate in line 96 to constitute recovered acqueous alcohol solution to be recycled to the extraction process (not shown). The evaporator 14 (3rd effect) is operated under vacuum maintained by the ejector 62 which follows the condenser 66. In this manner, latent heat inherent in the vapor stream from the desolventizer, (which most advantageously operates at atmospheric pressure) and from the ejector 62, is recovered by contributing part of the heat load of the 3rd effect, as discussed in the hereinabove mentioned copending application.

The vapor stream in line 54 is passed to a desolventizing system for treating extracted flakes, generally indicated as 70, such as described in U.S. Pat. No. 3,367,034. The initial step involves intimately contacting the solvent-wet meal in line 72 with super-heated solvent vapor in line 74 within a first solvent mixing chamber 76 preferably of an elongated slender configuration.

The superheated solvent vapor in line 74 has an alcohol concentration greater than the alcohol concentration of the solvent absorbed by the meal and is introduced in such a quantity that the sensible heat thereof in vapor form exceeds the heat of vaporization of the residual solvent in the meal. Upon mixing of the meal with the superheated vapor, the residual solvent evaporates and expands as it changes to the vapor form. The volumetric expansion due to the flashing of the liquid solvent to vapor assists in propelling the solids through the elongated chamber at a relatively high velocity together with the superheated solvent vapor.

The elongated chamber 76 is connected to a second chamber 78 in the form of a cyclone wherein the solvent vapor and meal are blown rapidly about in a whirlwind configuration so that the meal and vapor separate by centrifugal action. Dry meal dropping downward is removed by line 80; rising solvent vapors are withdrawn by line 82. A portion of the solvent vapor in line 82 is passed by line 54 to line 56. The remaining portion of the solvent vapor in line 82, combined in line 84 with the solvent vapor in line 54, is pumped by blower 86 through super-heater 88 to line 74.

In operation, feed, e.g. a carbohydrate-enriched alcohol solution, introduced into the evaporation system through line 20, flows through heat interchanger 46 into the tube side of evaporator 14 (the 3rd effect). This effect is heated by a vapor stream in line 56 which in specific and preferred application to protein concentrate processing may be a mixture of alcohol and water vapors from the desolventizing system 70 in line 58, and a vapor stream in line 60, mostly steam, from the steam-jet ejector 62. Condensate in line 64 withdrawn from the condenser 66 is combined in line 68 with condensate in line 96 to constitute the aqueous alcohol solution to be recycled to the extraction process (not shown). The pressure in the shell side of the heating bundle of the evaporator 14 (3rd effect) is atmospheric or slightly below atmospheric, since the shell side is vented to the atmosphere through a vent recovery system (not shown) through line 90. The evaporator 14 is operated under vacuum maintained by the ejector 62 which follows the condenser 66. In this manner, latent heat inherent in the vapor stream from the desolventizer system 70, (which most advantageously operates at atmospheric pressure) and from the ejector 62, is recovered by contributing all or part of the heat load of the 3rd effect.

The evaporator 12 (2nd effect) is operated in a normal manner with vapor from the first effect in line 50 condensing in the shell side of the heating bundle of the 2nd effect. Vapor from evaporator 12 in line 24 introduced into the rectifying tower 52 is passed in countercurrent contact with liquids from lines 32 and 92 to condense the less volatile material from such vapor. Consequently, the vapor stream in line 54 has an alcohol concentraton greater than the alcohol concentration of the residual solvent in the meal as hereinabove discussed.

The 1st effect 10 is heated by condensing steam from line 40 in the shell side of the heating bundle. Condensate is withdrawn through line 34. As discussed in the aforementioned copending application, the 1st effect evaporator 10 is provided with a stripping tower 48 to ensure that the liquid withdrawn through line 28 is essentially free of alcohol.

EXAMPLE OF THE INVENTION

The following example is illustrative of the conditions of the process of the present invention. In a process employing 70% ethanol as the solvent to make from white flakes a protein concentrate containing 70% protein (dry basis), the solvent ratio is 4 pounds of solvent per pound of flakes. Of these 4 pounds, 0.43 pound is in the flakes to be desolventized, and the remaining 3.57 pounds are in the miscella. Vapor leaving the rectifier in line 54 is about 1.96 pounds of 90.4% ethanol if all of the vapor generated in the 2nd effect is rectified. The alcohol concentration of the vapor recirculating in the desolventizer is about 87%, and the equilibrium concentration of alcohol in the flakes is about 82.5%.

While the invention has been described in connection with an exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof. What is claimed 1. In a process for treating a seed material with an aqueous solvent which contains an organic component to produce an extract solution and extracted material containing a residue of solvent, wherein desolventizing of said extracted material is accomplished in a desolventizer by direct contacting with a recirculating stream of superheated vapor, the improvement wherein said recirculating stream is a mixture of said organic component and water and having a concentration of organic component greater than the organic component concentration of the aqueous solvent in said residue said recirculating stream of superheated vapor, obtained by mixing vapor originating from said residue of solvent with vapor originating outside the desolventizer.

2. The process as defined in claim 1 wherein said extraction solvent is an aqueous solution of a low boiling alcohol selected from the group consisting of methanol, ethanol and propanol.

3. The process as defined in claim 2 wherein said seed material is defatted soybean flakes.

4. The process as defined in claim 2 wherein the concentration of said alcohol in said extraction solvent is between 65 and 75 percent by weight.

5. The process as defined in claim 1 wherein said vapor originating outside the desolventizer is made by rectifying the solvent in said extract solution.

6. The process as defined in claim 5 wherein said rectification is performed in one or more rectifiers, each of which is fed with vapor from one of the effects of a multiple-effect evaporator in which said extract solution is distilled.

7. The process as defined in claim 4 wherein said recirculating stream contains at least 87% by weight of said alcohol.

8. The process as defined in claim 6 wherein the vapor leaving the desolventizer is condensed in the heating space of one of said effects.

* * * * *